United States Patent [19]

Raj et al.

[11] Patent Number: 4,487,840

[45] Date of Patent: Dec. 11, 1984

[54] USE OF SILICON IN LIQUID SINTERED SILICON NITRIDES AND SIALONS

[75] Inventors: Rishi Raj; Sunggi Baik, both of Ithaca, N.Y.

[73] Assignee: Cornell Research Foundation, Inc., Ithaca, N.Y.

[21] Appl. No.: 506,466

[22] Filed: Jun. 21, 1983

[51] Int. Cl.³ ............................................. C04B 35/58
[52] U.S. Cl. ...................................................... 501/97
[58] Field of Search .................................... 501/97, 98

[56] References Cited

U.S. PATENT DOCUMENTS

| | | | |
|---|---|---|---|
| 3,215,547 | 11/1965 | Parr et al. | 501/92 |
| 3,262,761 | 7/1966 | Bechtold | 428/539.5 |
| 3,749,571 | 7/1973 | Stibbs et al. | 75/238 |
| 3,839,540 | 10/1974 | Arrol | 423/344 |
| 4,093,687 | 6/1978 | Greskovich et al. | 264/65 |
| 4,099,979 | 7/1978 | Lange et al. | 501/97 |
| 4,117,095 | 9/1978 | Komeya et al. | 423/344 |
| 4,124,402 | 11/1978 | Greskovich et al. | 501/92 |
| 4,177,230 | 12/1979 | Mazdiyasni | 264/60 |
| 4,179,301 | 12/1979 | Buljan | 501/97 |
| 4,243,621 | 1/1981 | Mori et al. | 501/98 |
| 4,285,895 | 8/1981 | Mangels et al. | 264/65 |

OTHER PUBLICATIONS

Greskovich, C., Journal of the American Ceramic Society, 64, 725–730 (12/81).
Jack, K. H., Journal of Materials Science 11, 1135–1158 (1976).
Lange, F. F., International Metals Review, 1980 No. 1, pp. 1–19.
Mitomo, M., Journal of Materials Science, 11, 1103–1107 (1976).
Smith, J. T., et al., Proceedings of Symposium of Factors in Densification and Sintering of Oxide and Non-oxide Ceramics, 426–441 (1978, Japan).
Terwilliger, G. R., et al., Journal of Materials Science 10, 1169–1174 (1975).

*Primary Examiner*—James Poer

[57] ABSTRACT

This invention relates to the production of improved high density nitrogen based ceramics by liquid-phase densification of silicon nitride or a compound of silicon-nitrogen-oxygen-metal, e.g. a sialon. In the process and compositions of the invention minor amounts of finely divided silicon are employed together with the conventional liquid phase producing additives to enhance the densification of the resultant ceramic.

7 Claims, 4 Drawing Figures

INFLUENCE OF SILICON ACTIVITY AND TEMPERATURE ON THE VAPOR PRESSURE OF NITROGEN GAS.

USE OF SILICON IN LIQUID SINTERED SILICON NITRIDES AND SIALONS

The invention described herein was made in part under the following Federal Grants: National Science Foundation DMR-79-24008 and Department of Energy DE-ACOZ-77ER04386, creating certain rights in the United States Government.

BACKGROUND OF THE INVENTION

Liquid phase densification of nitrogen based ceramics is well known in the art. The ceramic components are dry or wet mixed with liquid phase forming oxide additives such as magnesia, alumina, yttria, and the like. The resultant powder compact is then densified by hot-pressing, hot-isostatic pressing, or pressureless sintering. The preparation of nitrogen based ceramics by the above methods has been described, for example, by Lange, *International Metals Reviews*, 1980 No. 1, pp. 1–19; Jack, *J. Materials Science*, 11(1976): 1135–1158; Terwilliger et al., *J. Materials Science*, 10(1975): 1169–1174; Mitomo, *J. Materials Science*, 11(1976): 1103–1107; Greskovich, *J. Am. Ceramic Soc.*, 64: 725–730; and Smith et al., *Proc. of Symp. of Factors in Densification and Sintering of Oxide and Non-oxide Ceramics*, 1978, Japan.

The term liquid phase densification of ceramics is used to describe those processes where a small amount of a liquid phase present in the inter-particle interfaces of a powder compact leads to a significant enhancement in the densification rate as compared to the case where the liquid phase is not present. The mechanism of densification, in both cases, is diffusional transport of atoms from particle-particle interfaces to the interstitial pore regions formed by imperfect packing of particles in the powder compact. Densification is achieved as the pores are filled by the diffusion mechanism. The process is usually carried out at high temperatures. The liquid phase enhances densification by enhancing the diffusion rate of atoms along the interfaces.

While the liquid phase densification of nitrogen-based ceramics has shown promise, the attainment of maximum densities has been thwarted by a vaporization or volatilization phenomenon since apparently $N_2$ or other off gas is formed during the densification process, preventing maximum densification. Thermodynamic calculations and experiments in very low oxygen atmospheres have shown that one of the probable decomposition reaction is

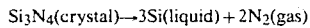

$$Si_3N_4(crystal) \rightarrow 3Si(liquid) + 2N_2(gas)$$

The resultant gas bubbles in the liquid phase prevent complete densification of the powder aggregate.

It is noted that the process for preparing reaction-bonded-silicon nitride is not intended to be included with the scope of this invention. In that process, a compact of at least a predominant amount of silicon powder is fired in a nitrogen atmosphere to produce silicon nitride. The resultant product of this process generally is porous and has inferior mechanical strength.

DESCRIPTION OF THE INVENTION

Figure 1A:
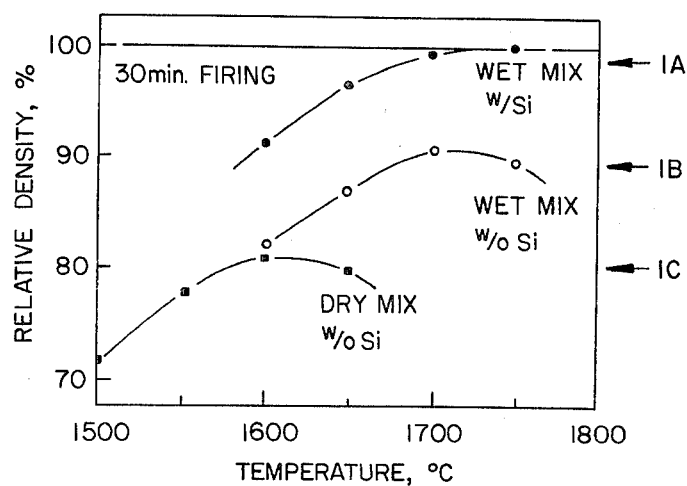
FIGS. 1a and 1b graphically present the results of Example 1.

This invention relates to the production of improved high density nitrogen based ceramics by liquid-phase densification of silicon nitride or a compound of silicon-nitrogen-oxygen-metal, e.g. a sialon. In the process and compositions of the invention, minor amounts of finely divided silicon, Si, are employed together with the conventional liquid phase producing additives to enhance the densification of the resultant ceramic.

The powders which can be densified in accordance with this invention include $Si_3N_4$ powders as well as sialon powders. Sialons, for example, described by Jack, supra, are compounds derived from silicon nitrides and oxynitrides first prepared by simultaneous replacement of silicon and nitrogen by aluminum and oxygen. It is now known that other metal atoms can be incorporated and the term sialon has become a generic one applied to materials where the structural units are $(Si,Al)(O,N)_4$ or $(Si,M)(O,N)_4$ tetrahedra. These powders are generally employed in the densifiable compositions in an amount which comprises between about 83% to about 99% and preferably about 93% to about 98% based on the total compositions. The powders employed are finely divided pulverulent materials typically having an average particle size of about 0.1 μm to about 10.0 μm and preferably about 0.1 μm to about 1.0 μm.

It is noted that a key to the present invention is the addition of silicon (Si). It is further noted that at times silicon nitride powders as produced have residual silicon in the central core region due to incomplete nitride formation. This residual silicon does not have the beneficial effect on the densification process in the same manner as the use of the free silicon powder as in the invention. The residual silicon in the core of the silicon nitride powder particles is isolated from the liquid phase, which wets the surface of the powder particles. Therefore, the use of silicon-nitride powder which contains residual silicon falls within the scope of this invention since the addition of free silicon will still lead to an improvement in liquid phase densification.

It is further noted that nitrogen based ceramic materials such as silicon nitride frequently contain silica, $SiO_2$, as a surface contaminant; such materials are within the scope of the ceramic forming pulverulent materials employable in the compositions and method of the invention.

In the process of the invention, known liquid phase producing bonding adjuvants are included in the compositions. These additives include magnesia (MgO), yttria ($Y_2O_3$); alumina ($Al_2O_3$), aluminum nitride (AlN), and silica ($SiO_2$) or mixtures thereof. Generally, these additives are employed in densification, enhancing amounts generally in the range of about 1% to about 7% by weight, based on the total composition. The particle size of these additives is usually generally between about 0.1 μm and about 10.0 μm and preferably between about 0.1 μm and about 1.0 μm.

The various components of the nitrogen based ceramic compositions, including the silicon can be mixed and blended employing the wet or dry mixing techniques well known in the art.

The resultant mixture is then adapted and fired using conventional ceramic forming techniques and methods. Firing is conducted in a nitrogen atmosphere at a temperature and a time sufficient to form a high density ceramic body generally having a density of at least about 95% and preferably at least about 98% of theoretical density. The temperature employed is generally at least about 1600° C. and preferably at least about 1700° C. The time varies with the components but routine experimentation will readily determine the optimum time and temperature to obtain maximum density.

Since as theorized hereinafter, the system is dynamic, the compositions preferably should be brought to sintering temperature reasonably rapidly and should not be held at that temperature substantially beyond the time required to achieve maximum density.

The compositions of the invention can be formed into ceramics by hot-pressing, hot isostatic pressing or pressureless sintering. However, since pressureless sintering has obvious advantages as to economics and the size and shape of the resultant ceramics and since very high and even theoretical densities can be obtained using the compositions described in the pressureless sintering process, that process is preferred.

EXAMPLE 1

The following silicon nitride compositions were mixed and sintered:

| Material | Composition | | |
|---|---|---|---|
| | A | B | C |
| | Parts by weight | | |
| $Si_3N_4$ (99.9% purity - 325 mesh) | 95 | 95 | 95 |
| MgO | 5[1] | 5[1] | 5[2] |
| Silicon (99.5% purity - 325 mesh) | 5 | — | — |
| mixing method | wet | wet | dry |

Notes:
[1] Added in the form of $Mg(NO_3)_2 \cdot 6H_2O$
[2] Added as powder, 99.5% purity, 325 mesh.

The compositions were blended and mixed as follows:

Dry Mixing: The powders were weighed and added to isopropyl alcohol of approximately equal weight. The mixture was milled for 24 hours in a plastic bottle with tungsten-carbide balls. Dry powder was obtained by evaporating the isopropyl alcohol. The mixture was constantly stirred during the drying process.

Wet-Mixing: Magnesium nitrate was dissolved in isopropyl alcohol and the remaining powders were added to this solution. The mixture was thoroughly blended and then dried on a hot plate with continuous stirring. The powder was crushed with a mortar and calcined at 700° C. for 5½ hours. The calcined powder was carried through the dry-mixing procedure described in the preceding paragraph.

Figure 1B:
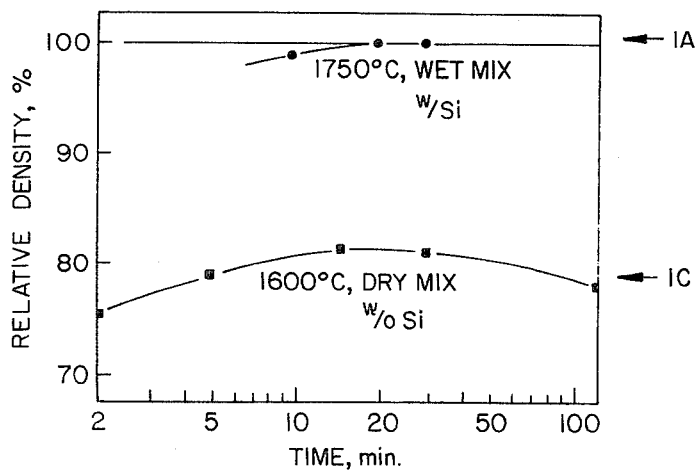

The compositions were molded and fired as follows: The compositions were cold die-pressed into cylindrical specimens about 15 mm long and 12.5 mm in diameter. The specimens were sintered in nitrogen at one atmosphere pressure. The final density was measured as a function of temperature and time. The results are shown in FIGS. 1a and 1b. In the $Si_3N_4$—5% MgO system 100% densification was achieved by the addition of silicon whereas without silicon densities significantly less than 100% were measured under the same condition.

EXAMPLE 2

The following MgO doped sialon ($Si_3N_4$-$SiO_2$-AlN-MgO) system was mixed and sintered:

| Material | Compositions | |
|---|---|---|
| | A | B |
| | Parts by Weight | |
| $Si_3N_4$ (99.9% purity - 325 mesh) | 64 | 64 |
| $Al_2O_3$ (99.8% purity - 0.25μ) | 21 | 21 |
| AlN (99% purity - size) | 9 | 9 |
| $SiO_2$ (99.% purity - 325 mesh) | 1 | 1 |
| MgO (99.5% purity - 325 mesh) | 5 | 5 |
| Si (99.5% purity - 325 mesh) | 5 | — |

The compositions were blended and mixed as follows:

The powder compositions were blended and mixed in isopropyl-alcohol of approximately equal weight. The mixture was milled for 24 hours in a plastic bottle with tungsten-carbide balls. Dry powder was obtained by evaporating isopropyl-alcohol. Continuous stirring was used during the drying process.

Figure 2:
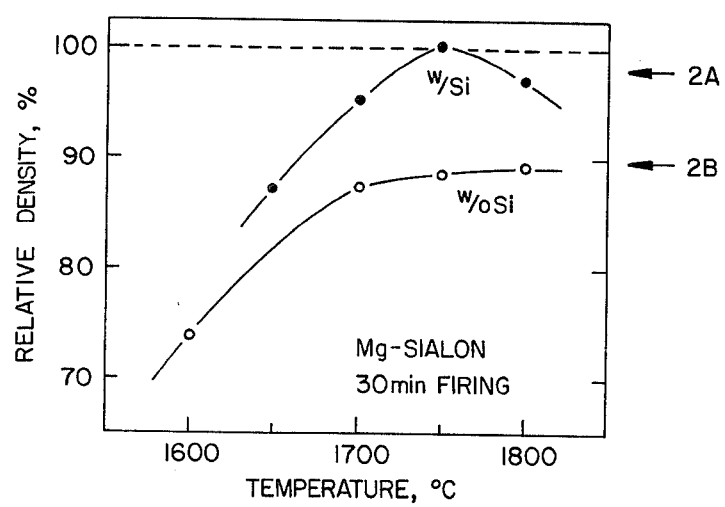
FIG. 2 graphically presents the results of Example 2.

The dry powder mixture was molded into cylindrical specimens 15 mm long and 12.5 mm in diameter, using a steel die for cold-pressing. The specimens were sintered in nitrogen at one atmosphere pressure for 30 minutes. The final density was measured as a function of temperature. Using silicon, a hundred percent dense material was obtained in 30 minutes at 1750° C. Without silicon, a maximum density of 87% was obtained. The results are set forth in FIG. 2.

It is noted that the silicon which is added to enhance densification is converted to silicon nitride during densification. This was shown by transmission electron microscopy. It is theorized that the beneficial effect of silicon in densification is obtained before the silicon is fully converted to silicon nitride. Densification in the presence of elemental silicon in the liquid phase and nitridation of silicon appear to be competitive kinetic processes. The size of the silicon powder particles, their weight fractions and uniformity of distribution will influence the relative kinetics. The rate of heating up and residence time will also influence the maximum and final density of the sintered product.

Figure 3:
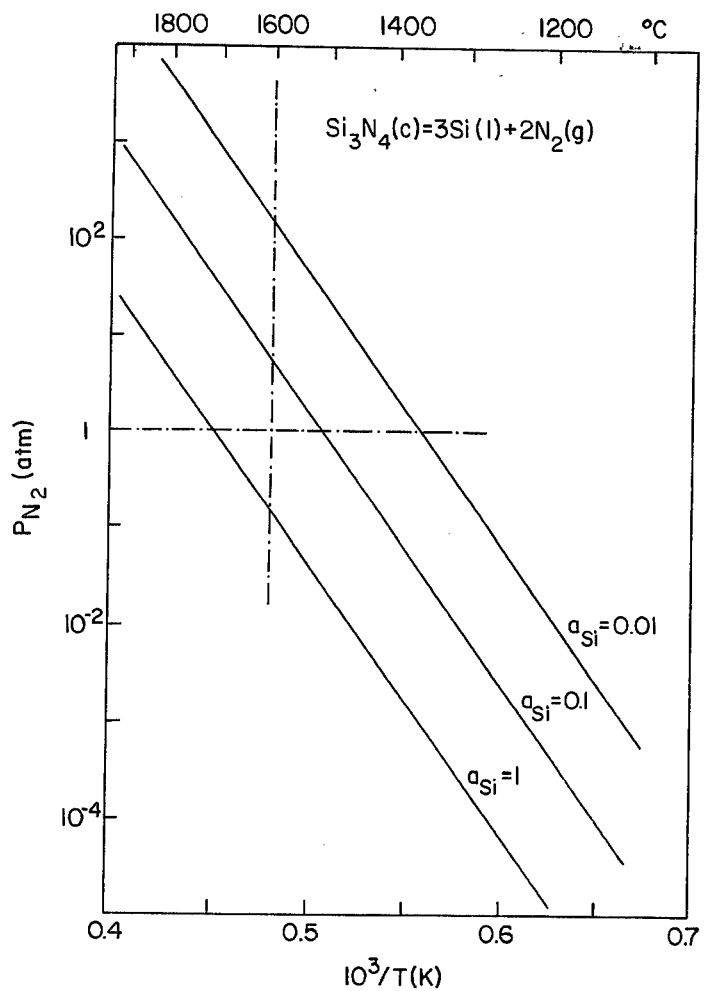
FIG. 3 graphically analyzes the influence of silicon activity and temperature on the vapor pressure of nitrogen gas in a $Si_3N_4$ system.

Thermodynamic analysis of reaction $Si_3N_4(crystal) \rightarrow 3Si(liquid) + 2N_2(gas)$ leads to the results shown in FIG. 3 which gives the vapor pressure of $N_2$ as a function of the activity of silicon and the temperature. Note, for example, that increasing the activity of Si to one depresses the vapor pressure of nitrogen to 0.1 atmospheres at 1600° C. These calculations support the results obtained in that increasing the activity of silicon appears to depress volatilization which in turn enhances final density.

We claim:
1. A composition adapted to form ceramics having a high density which comprises:
   (a) At least about 83% of at least one finely divided pulverulent nitrogen based ceramic forming material, said finely divided nitrogen based ceramic forming material having an average particle size ranging from 0.1 μm to about 10.0 μm.

(b) A minor pulverulent liquid phase forming amount of liquid phase forming additive; and (c) A minor densification enhancing amount of pulverulent silicon.

2. The composition as in claim 1 where the nitrogen based ceramic forming material is selected from the group consisting of silicon nitride, silicon oxynitride and a sialon.

3. The composition as in claims 1 or 2 where the liquid phase forming oxide is selected from the group consisting of magnesia, yttria, alumina, silica and mixtures thereof.

4. The composition as in claim 3 where the silicon is present in an amount of about 1% to 7% by weight based on the total composition.

5. A composition as recited in claim 1 in which there is present at least about 90% of said finely divided pulverulent nitrogen based ceramic forming material.

6. A composition as recited in claim 1 in which there is present at least about 93% of said finely divided nitrogen based ceramic forming material.

7. A composition as recited in claim 1 or 5 in which the nitrogen based ceramic forming material is silicon nitride.

* * * * *